(12) United States Patent
Franchet et al.

(10) Patent No.: US 6,767,187 B2
(45) Date of Patent: Jul. 27, 2004

(54) ELECTROHYDRAULIC DEVICE FOR VARYING THE PITCH OF THE BLADES OF A MACHINE ROTOR

(75) Inventors: Michel Franchet, Pouilly-le-Fort (FR); Daniel Kettler, Chartrettes (FR); Jean-Pierre Ruis, Le Chatelet en Brie (FR)

(73) Assignee: SNECMA Moteurs, Paris (FR)

( * ) Notice: Subject to any disclaimer, the term of this patent is extended or adjusted under 35 U.S.C. 154(b) by 91 days.

(21) Appl. No.: 10/277,750

(22) Filed: Oct. 23, 2002

(65) Prior Publication Data

US 2003/0077173 A1 Apr. 24, 2003

(30) Foreign Application Priority Data

Oct. 24, 2001 (FR) .............................................. 01 13715

(51) Int. Cl.[7] .................................................. F01D 7/00
(52) U.S. Cl. .................................................. 416/157 R
(58) Field of Search ................................ 416/155, 156, 416/157 R, 158; 440/50

(56) References Cited

U.S. PATENT DOCUMENTS

| | | | |
|---|---|---|---|
| 3,900,274 A | * | 8/1975 | Johnston et al. ............ 416/155 |
| 3,901,626 A | * | 8/1975 | McMurtry ............... 416/157 R |
| 5,213,472 A | * | 5/1993 | Dumais ........................ 416/61 |
| 5,320,499 A | * | 6/1994 | Hamey et al. ............... 417/218 |
| 5,897,293 A | | 4/1999 | Arel et al. |

FOREIGN PATENT DOCUMENTS

| | | |
|---|---|---|
| EP | 0 154 808 | 9/1985 |
| EP | 1 081 390 | 3/2001 |
| FR | 890 641 | 2/1944 |
| FR | 2 712 250 | 5/1995 |
| GB | 2 016 598 | 9/1979 |
| WO | WO 92/08896 | 5/1992 |

\* cited by examiner

Primary Examiner—Ninh H. Nguyen
(74) Attorney, Agent, or Firm—Oblon, Spivak, McClelland, Maier & Neustadt, P.C.

(57) ABSTRACT

An electrohydraulic device for varying the pitch of the blades of a machine rotor, the blades being mounted on a hub rotated by a drive shaft of the machine, and each blade having a root capable of pivoting about a longitudinal axis of the blade, the drive shaft itself being rotated relative to a stationary structure of the machine, the device comprising firstly a hydraulic actuator whose piston is secured to a control and synchronization ring in which off-center wrist pins are engaged, each fixed in register with one of said blade roots, and having a cylinder closed by a cover that includes a high pressure hydraulic pump feeding hydraulic fluid to both faces of said piston via channels integrated in said cylinder of the actuator, and secondly an electric motor controlled and powered by an electricity generator comprising an inductor secured to said stationary structure of the machine and an armature secured to said drive shaft of the machine.

12 Claims, 1 Drawing Sheet

ELECTROHYDRAULIC DEVICE FOR VARYING THE PITCH OF THE BLADES OF A MACHINE ROTOR

FIELD OF THE INVENTION

The present invention relates to a device for changing propeller pitch by using an electrohydraulic actuator. It is applicable to any system provided with a propeller, e.g. a wind generator or an industrial fan, as well as to turboprops and to turbojets provided with a fan comprising a plurality of blades that can be set at variable angles.

PRIOR ART

In order to increase the performance and improve the efficiency of a turbomachine engine throughout all of its operating stages, from takeoff to landing, it is known to have recourse to varying the pitch of a propeller or a fan. Such variable settings also make it possible to vary the speed of the propeller or the fan to obtain the desired thrust without varying the speed of the turbine which is in general set to its maximum continuous speed, or indeed during landing to reverse said thrust, thus replacing conventional thrust reversal systems that are heavy and complex.

Present devices for varying propeller pitch generally comprise hydraulic actuators (one actuator driving each blade root) which deliver the force needed to place the propeller in the desired position. Nevertheless, those devices are particularly complex and bulky, and they also present major problems of reliability, due in particular to using rotary couplings or joints. It is important to avoid any hydraulic fluid leakage into the turbine since that will degrade its performance, or can even set it on fire, and it is important to limit any risk of pollution (contaminating air intakes). U.S. Pat. No. 5,897,293 is a good illustration of that type of hydraulic device comprising very numerous pipes, hydraulic valves, and rotary joints which need to pass through or along the body and the drive shaft of the turbomachine.

Propeller pitch can also be controlled by an electrical drive system based on permanent magnet motors or an asynchronous motors associated with screw-and-nut systems (see for example EP 0 154 808) or with respective gearwheels secured to each of the blades (FR 890 641 and FR 2 712 250, for example). Nevertheless, such systems need to resort to motors that are bulky in order to deliver the high levels of power needed to change propeller pitch quickly without excessively gearing down the pitch-setting mechanism.

OBJECT AND DEFINITION OF THE INVENTION

The present invention seeks to mitigate the drawbacks of those prior art devices with a propeller pitch control device that is simple, compact, and particularly reliable. An object of the invention is specifically to propose a control device which eliminates any risk of hydraulic leakage.

These objects are achieved by an electrohydraulic device for varying the pitch of the blades of a machine rotor, the blades being mounted on a hub rotated by a drive shaft of the machine, and each blade having a root capable of pivoting about a longitudinal axis of the blade, the drive shaft itself being rotated relative to a stationary structure of the machine, the device comprising firstly a hydraulic actuator whose piston is secured to a control and synchronization ring in which off-center wrist pins are engaged, each fixed in register with one of said blade roots, and having a cylinder closed by a cover that includes a high pressure hydraulic pump (preferably a piston pump) feeding hydraulic fluid to both faces of said piston via channels integrated in said cylinder of the actuator, and secondly an electric motor controlled and powered by an electricity generator comprising an inductor secured to said stationary structure of the machine and an armature secured to said drive shaft of the machine.

This structure leads to a highly simplified control device that is particularly compact and easy to implement. Any risk of leakage is greatly reduced because of the absence of any rotary couplings and pipework.

The electricity generator may be constituted by a rotary transformer or by a collector system comprising smooth slip rings and brushes. It is actuated by an electronic control circuit connected firstly to a machine power supply device and secondly to a machine computer, and arranged to modulate the electricity supplied to said electric motor as delivered by said power supply device so as to act on the operating speed and/or time, and the direction of rotation of said high pressure hydraulic pump in order to obtain determined displacement of the piston corresponding to the setting desired for the rotor blades.

The hydraulic actuator preferably includes a linear variable displacement transducer (LVDT) type sensor constituted by a cylindrical tube secured to the cylinder of the actuator and a plunging core secured to a piston rod and capable of moving linearly in the tube.

The invention is equally applicable to the fan of a turbojet and to the propeller of a turboprop, to a wind generator, or to an industrial fan. Advantageously, in the field of aviation, the computer is the full authority digital engine computer (FADEC) of the turboprop or the turbojet.

BRIEF DESCRIPTION OF THE DRAWING

The characteristics and advantages of the present invention appear better from the following description given by way of non-limiting indication and with reference to the sole FIGURE which is a fragmentary axial section through the front end of a turboprop that includes a propeller pitch control device in accordance with the invention.

DETAILED DESCRIPTION OF A PREFERRED EMBODIMENT

Figure 1:
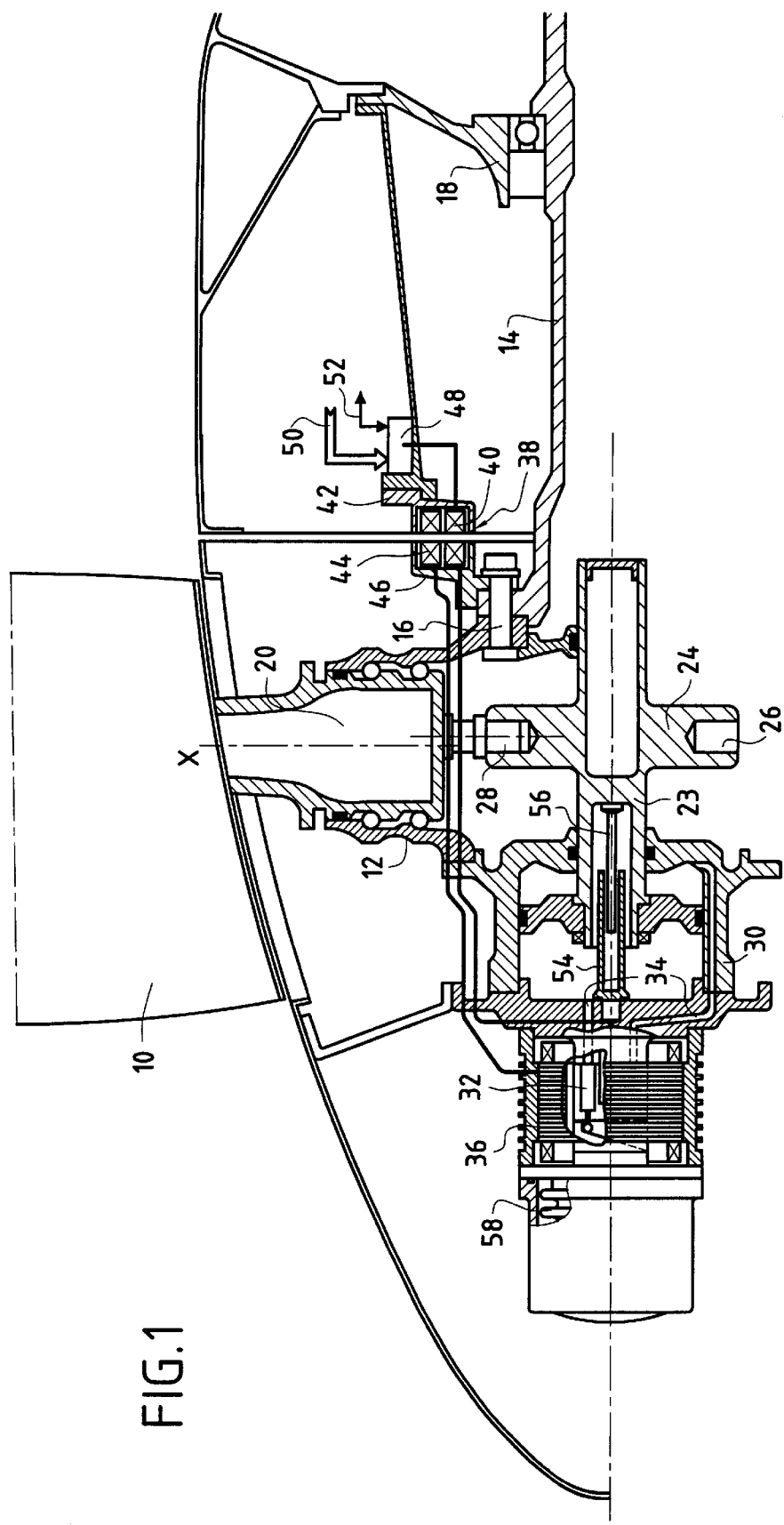

In the example shown, the turboprop has a propeller comprising a plurality of blades 10 mounted on a hub 12 rotated by the main drive shaft 14 of the turboprop (via first fixing means 16), said drive shaft itself being rotated relative to a stationary structure 18 of the turboprop by a gas generator acting through a speed reducer (both not shown). Each blade has a root or pivot 20 that can be turned about its longitudinal axis X.

According to the invention, the propeller pitch control device comprises a hydraulic actuator whose piston 22 is secured by means of its rod 23 to a control and synchronizing ring 24 having axial bores 26 receiving off-center wrist pins 28 fixed beneath respective propeller roots, with the cylinder 30 of the actuator being closed by a cover that includes a high pressure hydraulic pump 32 of the type having pistons that are axial or radial.

The pump feeds both faces of the piston 22 with hydraulic fluid via channels 34 integrated in the cylinder 30 of the actuator. It is itself driven by an electric motor 36, preferably of the asynchronous type or of the permanent magnet type so as to eliminate friction and wear (and therefore also maintenance), being controlled and powered electrically via an electricity generator 38 having an inductor 40 fixed on a first support piece 42 secured to the stationary structure 18 of the turboprop and an armature 44 fixed on a second support piece 46 placed facing the preceding piece and secured to the turboprop drive shaft 14.

An electronic control circuit 48 connected firstly via a power connection 50 to the electrical power supply unit of the turboprop (not shown) for delivering the electrical power needed for controlling the electric motor, and secondly via an electrical connection 52 to the FADEC of the turboprop (not shown) for delivering the control information (blade pivot angle) needed for varying the pitch of the propeller, serves to modulate the supply of electricity to the motor as a function of aircraft flight conditions and as a function of information supplied by torque and speed sensors (not shown) situated on the drive shaft 14 of the turboprop, thus serving to act on the operating speed and/or time and also on the direction of rotation of the hydraulic pump 32, thereby causing the piston 22 of the actuator to move as appropriate for setting the propeller blades in the desired position (and thus obtain the desired thrust). The angular position of each blade is preferably monitored by an LVDT type linear sensor mounted inside the actuator and formed by a cylindrical tube 54 secured to the actuator cylinder 30 and by a plunger core 56 secured to the piston rod 23 and capable of moving linearly in said tube. An example of such a sensor is given in European patent application EP 1 081 390. Any displacement of the core in the tube corresponds to an electrical output signal delivered to the computer by the LVDT sensor and representative of the position of the actuator rod, is itself proportional to the pivot angle of the blade. The displacement sensor is preferably of the redundant type having two independent output signals.

The electricity feed means may be constituted by a conventional system having a smooth slip ring collector (constituting the armature) mounted on the second support piece 46 and secured to the drive shaft 14 co-operating with brushes (constituting the inductor) mounted on the first support piece 42 and secured to the stationary structure 18. These means can also and preferably be implemented by a rotary transformer comprising an inductor coil mounted on the first support piece 42 and secured to the stationary structure 18 and an armature coil mounted on the second support piece 46 and secured to the drive shaft 14, thus forming a current generator.

In outline, the control device of the invention operates as follows.

The control device is actuated when, during some stage of aircraft flight, the pilot desires to change the thrust of the airplane. To do this, the FADEC sends an order to the electronic control circuit causing it to generate excitation current in the inductor of the generator so as to create an electric field in the armature situated facing it and rotated by the propeller drive shaft. This electric field is transformed into electrical current in the armature of the generator and is fed directly to the electric motor. The excitation current is modulated to a greater or lesser extent so as to cause the magnetic field and thus the speed of the electric motor to vary, the motor acting in turn on the speed of the hydraulic pump. In order to be able to drive the electric motor in one direction or the other, both the inductor and the armature of the current generator are preferably constituted by respective pairs of concentric coils that are excited separately for each direction of rotation.

The hydraulic fluid present in the pump 32 and which is taken from one of the faces of the piston 22 and is delivered to the other, in alternation, constitutes a closed circuit in the pump and actuator assembly, with variations in fluid volume due to its compressibility or to its expansion being compensated in conventional manner by an accumulator 58 included in said high pressure hydraulic pump. A high speed of rotation of the electric motor corresponds to a high speed of displacement of the piston, and the length of time it operates defines the length of the displacement and thus the propeller pitch setting.

It should be observed that in order to obtain further savings in weight and bulk, the assembly formed by the hydraulic pump and the electric motor can advantageously be replaced by an electrically driven pump having integrated pistons, the cylinder system of the pump then acting as the rotor (which preferably has permanent magnets or is asynchronous). In addition, all of the components of the electrically driven pump and of the accumulator lie on the axis of the actuator so as to obtain good axial symmetry, thus enabling the entire assembly to be rotated without any unbalance, or at least making it easy to balance.

This simplification in the transfer of commands, associated with the compactness of the control device of the invention, releases space in the body of the turbomachine and also provides the opportunity for completely redesigning the structure of the engine (casing, gearbox, propeller shaft, for example) and thus obtaining additional savings in weight and cost.

With the invention, access to the hydraulic pump and to its electric drive motor (or to the integrated electrically driven pump) is easy and quick because of its modular structure, thus facilitating maintenance (inspection or replacement) while also reducing cost. In addition, although delivering power via a rotary transformer appears to be relatively more complex, it presents the advantage of taking place without friction and thus without wear, unlike delivering power using slip rings and brushes, which are simpler in structure and which also present the advantage of being lighter in weight. Nevertheless, in favor of the slip ring solution, it should be observed that the speed of rotation of propellers, e.g. in a large turboprop, is relatively low (lying in the range 1000 revolutions per minute (rpm) to 1500 rpm) so wear is, a priori, quite low. It should also be observed that as a safety precaution, the number of brushes can be doubled.

What is claimed is:

1. An electrohydraulic device for varying the pitch of the blades of a machine rotor, the blades being mounted on a hub rotated by a drive shaft of the machine, and each blade having a root capable of pivoting about a longitudinal axis of the blade, the drive shaft itself being rotated relative to a stationary structure of the machine, the device comprising firstly a hydraulic actuator whose piston is secured to a control and synchronization ring in which off-center wrist pins are engaged, each fixed in register with one of said blade roots, and having a cylinder closed by a cover that includes a high pressure hydraulic pump feeding hydraulic fluid to both faces of said piston via channels integrated in said cylinder of the actuator, and secondly an electric motor controlled and powered by an electricity generator comprising an inductor secured to said stationary structure of the machine and an armature secured to said drive shaft of the machine.

2. A device according to claim 1, wherein said current generator is actuated by an electronic control circuit connected firstly to an electrical power supply of the machine and secondly to a computer of the machine.

3. A device according to claim 2, wherein said electronic control circuit is arranged to modulate the supply of current to said electric motor as taken from said power supply device in such a manner as to act on the operating speed and/or time and on the direction of rotation of said high pressure hydraulic pump so as to obtain a determined displacement of the piston corresponding to a desired setting for the rotor blades.

4. A device according to claim 3, wherein said high pressure hydraulic pump is of the axial or radial piston type.

5. A device according to claim 1, wherein said current generator is constituted by a rotary transformer.

6. A device according to claim 1, wherein said current generator is constituted by a smooth slip ring collector and brush system.

7. A device according to claim 1, wherein said hydraulic actuator includes an LVDT type linear sensor constituted by a cylindrical tube secured to said actuator cylinder and by a plunger core secured to a rod of the piston and capable of moving linearly in said tube.

8. A device according to claim 1, wherein said rotor is a turboprop propeller.

9. A device according to claim 1, wherein said rotor is a turbojet fan.

10. A device according to claim 8 or claim 9, wherein said computer is the FADEC of the turboprop or the turbojet.

11. A device according to claim 1, wherein said rotor is the propeller of a wind generator.

12. A device according to claim 1, wherein said rotor is an industrial fan propeller.

* * * * *